April 15, 1941.  E. B. THOMPSON  2,238,237
VEHICLE DUMP
Filed Oct. 2, 1939   3 Sheets-Sheet 1
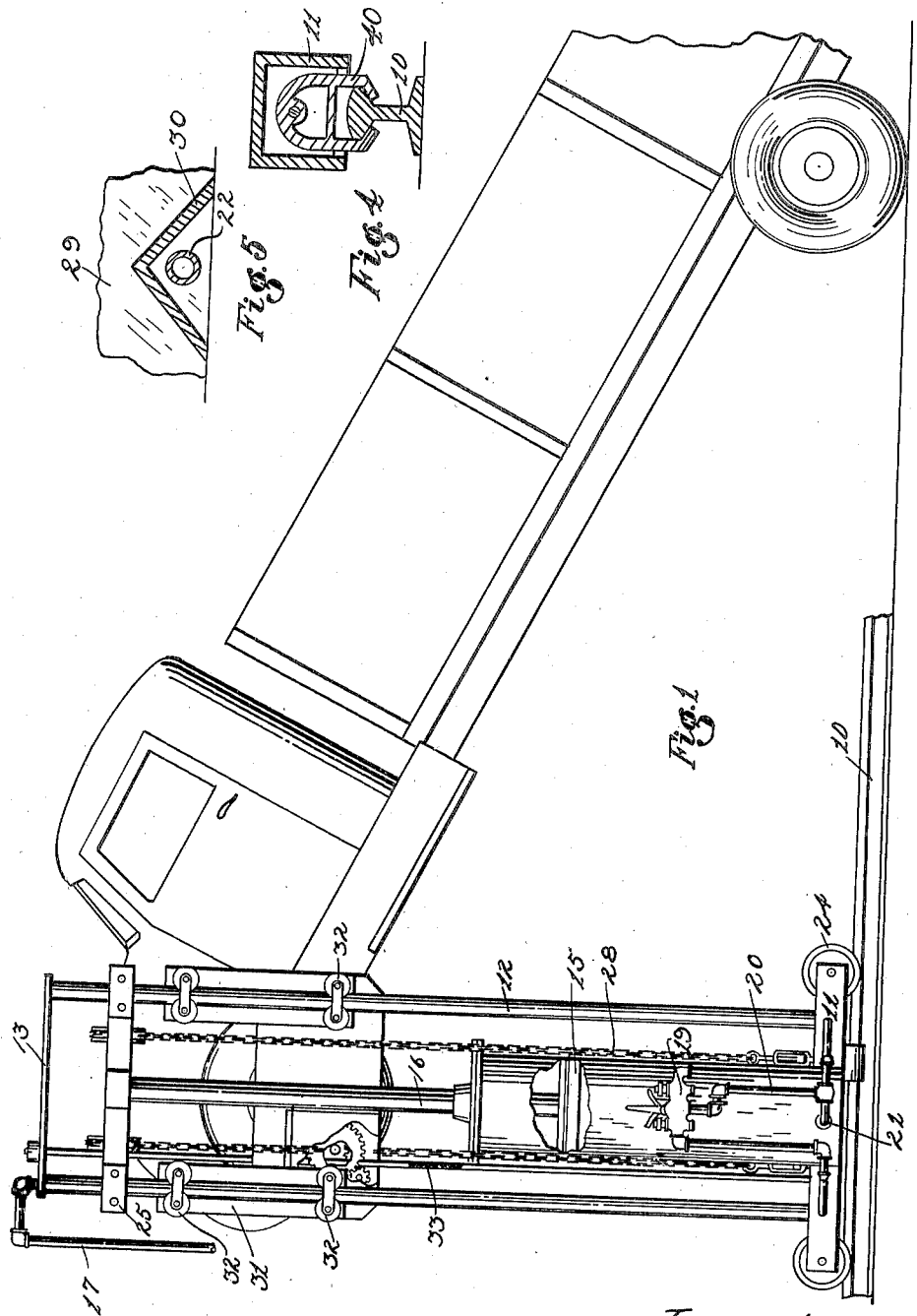
Inventor.
Elmer B. Thompson
by Orwig & Hague Attys

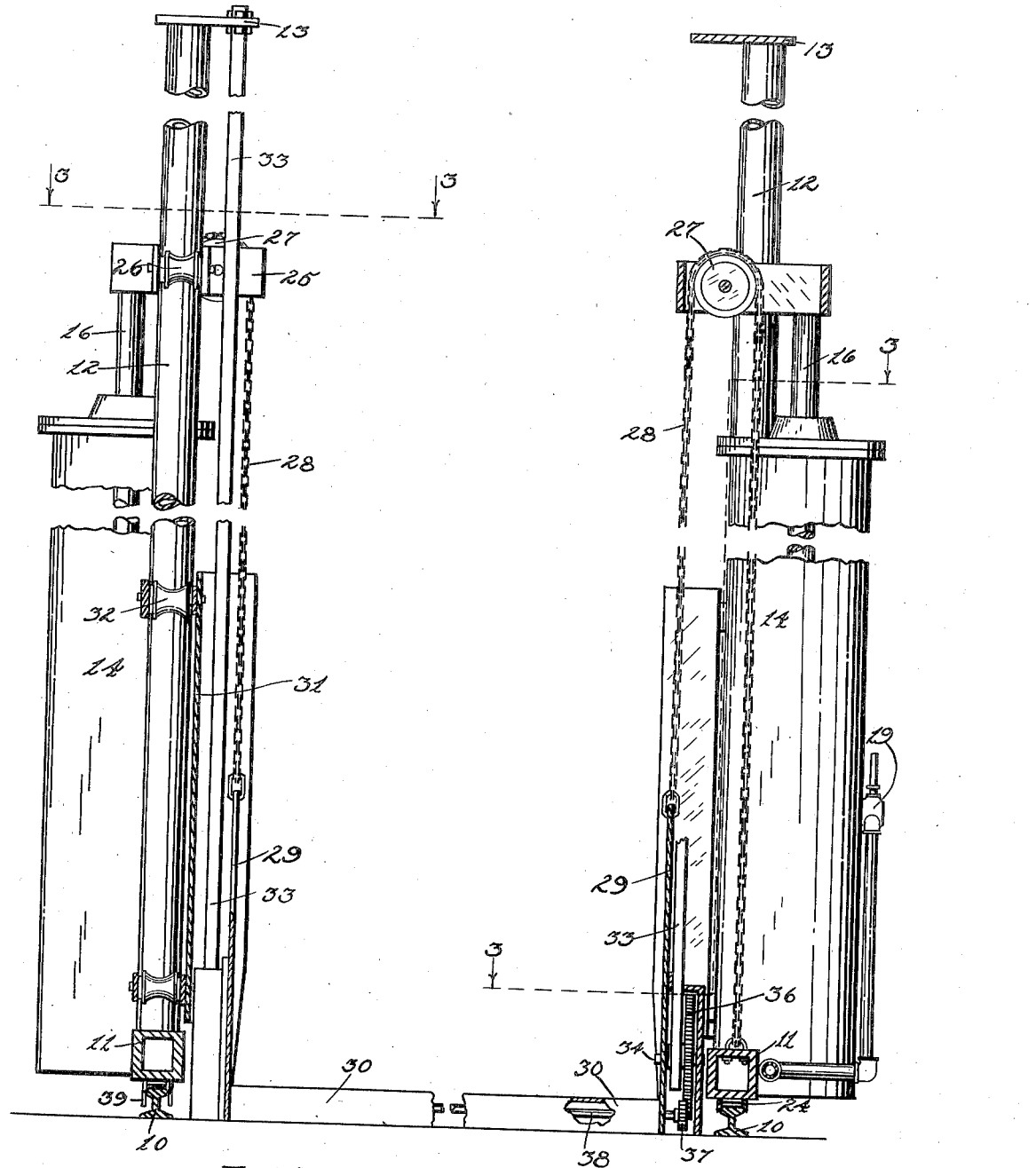

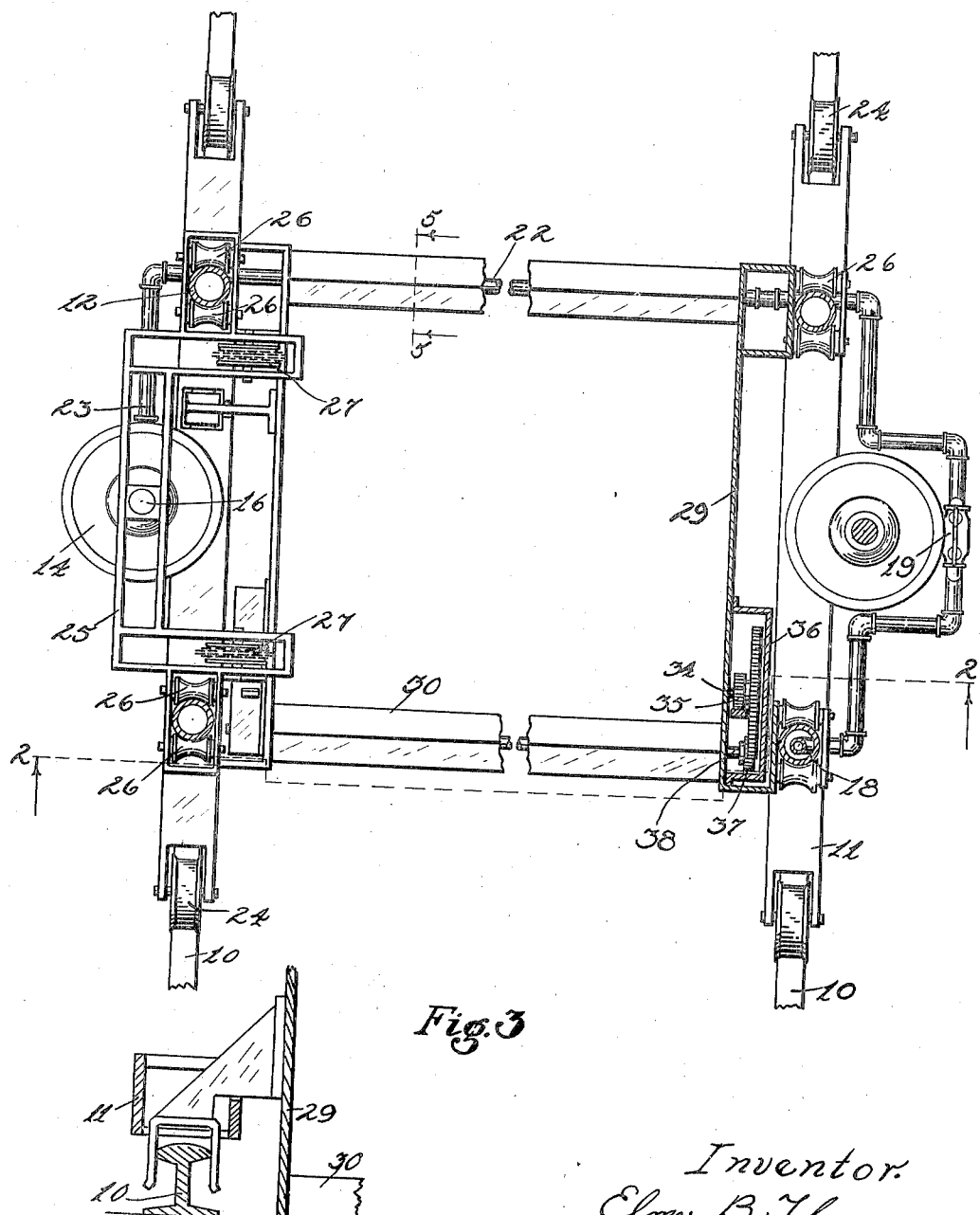

Patented Apr. 15, 1941

2,238,237

UNITED STATES PATENT OFFICE 2,238,237

VEHICLE DUMP

Elmer B. Thompson, Des Moines, Iowa, assignor to Globe Hoist Company, Des Moines, Iowa, a corporation of Iowa Application October 2, 1939, Serial No. 297,528

5 Claims. (Cl. 214—46.5)

The object of my invention is to provide a vehicle dump of simple, durable and inexpensive construction in the form of a unitary self-contained and self-supporting structure whereby it may be installed by simply placing it upon a floor and making it unnecessary to secure or support it in any manner, whereby it may be readily and easily removed and reinstalled by unskilled workmen.

A further object is to provide a vehicle dump with which a large number of vehicles may be serviced in a minimum of time, and in this connection more specifically to provide a vehicle dump in which the vehicle wheel cradle is automatically moved to proper position relative to the dumping compartment by the act of the vehicle driver in stopping the vehicle with its discharge end over the dumping compartment, and applying the brake to the rear wheels, all of the other movements of the vehicle dump being automatically accomplished when compressed air is admitted into the cylinders.

A further object is to provide a vehicle dump in which the upright side members are connected only by the vehicle wheel cradle, thereby leaving a clear space for vehicles between and above the side members.

A further object is to provide improved and simplified means for automatically maintaining the vehicle wheel cradle in a horizontal position during its up and down movements, regardless of whether or not the vehicle weight is greater at one side than the other and regardless of whether or not unequal pressure is applied to the wheel cradle, and whereby binding strains on the guide are avoided.

A further object is to provide simple and inexpensive means for preventing lateral movement of the two upright members relative to each other and to prevent or limit forward or rearward tilting movements thereof.

A further object is to provide a vehicle dump of the pneumatic class in which the vertical movement of the vehicle wheel cradle will be substantially greater than the vertical movement of the pistons, whereby relatively short cylinders may be used.

A further object is to provide simple and inexpensive means for securing the vehicle wheel cradle to the supporting rails when in lowered position, to thereby prevent the vehicle wheels from moving the cradle when being moved to or from the cradle, and to automatically release same when the cradle has been slightly elevated, to thereby permit the cradle to move horizontally of the rails during a dumping operation.

A further object is to provide a vehicle dump of the pneumatic class, having a cylinder at each side, with a pipe connecting the cylinders, and means for protecting the pipe from injury or movement by vehicle wheels.

Referring to the accompanying drawings—

Figure 1 shows a side elevation of my improved vehicle dump with an automobile truck in dumping position supported by the lift;

Figure 2 shows a vertical sectional view of my improved vehicle dump taken on the line 2—2 of Figure 3;

Figure 3 shows a horizontal sectional view of the same taken on the line 3—3 of Figure 2;

Figure 4 shows a detail view illustrating the means for preventing longitudinal tilting movement of the vehicle dump;

Figure 5 shows a transverse sectional view on the line 5—5 of Figure 3; and

Figure 6 shows a detail end view illustrating the gripping fingers for preventing longitudinal movement of the vehicle wheel cradle when in lowered position.

One of the uses for which my improved dump is especially designed is the dumping of grain trucks or wagons in grain storage bins. The sheds are usually provided with a driveway, and in the driveway there are one or more openings through which grain of different classes is dumped.

My improvement comprises two rails 10, of the ordinary T rail variety, arranged in parallel position on opposite sides of the runway beyond the dumping openings. Mounted upon each of the rails is an upright frame, comprising a base member 11, and upon this base member, near the opposite ends thereof, are two upright tubular posts 12 connected at their upper ends by a brace bar 13. At the central portion of each of the base members 11 is an upright cylinder 14. This cylinder, as shown in Figure 1, is approximately half the height of the frame in which it is mounted. In the cylinder is a piston 15, and a piston rod 16 projects upwardly through the cylinder.

For supplying fluid pressure to the cylinders I have provided a conducting pipe 17 which extends downwardly through one of the upright posts 12, as shown at 18 in Figure 3. This pipe leads to a valve mechanism, indicated generally by the reference numeral 19; and communicating with this valve mechanism is a conductor pipe 20, which enters the adjacent cylinder at 21 and which also extends across the space between the rails, as shown at 22 in Figure 3, and then into the opposite cylinder 14, as shown at 23 in Figure 3. The said valve mechanism 19 is of ordinary construction, not herein shown in detail, but is of that class which, when in one position, admits fluid pressure into both cylinders, and in another position permits the exhaust of air from both cylinders.

Each of the base members 11 is provided with two flanged supporting wheels 24 resting upon the rails 10 and held by their flanges against lateral movement relative to the rails, but being free to move longitudinally of the rails.

Fixed to the upper end of each piston is a bracket 25, which, as shown in Figure 3, has two sheaves, or grooved rollers, 26, at each end, engaging opposite sides of the upright cylindrical post 12, to thereby guide the bracket during its vertical movement upon the upright posts and to prevent the bracket from moving either longitudinally or laterally during its up and down movement. This bracket 25 is also provided with two pulleys 27, arranged with their axes at right angles to the rails 10.

Two chains or cables 28 are secured at one end to the base 11, passed upwardly over said pulleys, and then downwardly where they are attached to a vehicle wheel cradle to be hereinafter described. By means of these pulleys and chains, thus arranged, the movement of the vehicle wheel cradle is made to be just twice the amount of movement of the pistons. Hence, relatively short and inexpensive cylinders may be employed to attain the desired maximum elevation of the vehicle wheel cradle.

The vehicle wheel cradle comprises two frame members 29 connected by the cradle cross bars 30 and thereby forming a unitary, substantially rectangular, rigid structure. These cradle members 30 are preferably of substantially inverted V shape, as shown in Figure 5, and their edges may rest upon the floor when in lowered position, and when thus resting on the floor they will protect the pipe at 22 against injury or misplacement by the vehicle wheels. At each end of each cradle frame are the upright cradle members 31, and at the upper and lower ends of each of these upright cradle members 31 are two sheaves, or grooved pulleys, 32, for engaging opposite faces of the uprights 12, as clearly shown in Figure 3. By this means both lateral and longitudinal tilting movements of the vehicle wheel cradle relative to the uprights 12 is avoided or minimized, and by this means lateral tilting movements of the upright frames is avoided and the frames are always held in their upright positions without the necessity of having any bracing means at the top of the upright frames. This is of advantage because, in many instances, the grain shed in which the vehicle dump is installed has a relatively low ceiling, and by this arrangement the top of the front part of the vehicle may be moved as high as is necessary for dumping purposes, without engaging any such cross-bracing members.

For the purpose of causing both side frame members 29 of the vehicle wheel cradle device to move upwardly and downwardly, and maintain the same horizontal plane at all times, I have provided two upright rack bars 33 fixed at their upper ends to the brace member 13, and at their lower ends to a part of the base 11. Mounted in the frame 29 is a shaft 34, having thereon a pinion 35 in mesh with the adjacent rack. A large pinion 36 is fixed to the shaft 34, and is in mesh with a small pinion 37. This pinion 37 is fixed to a shaft 38, which extends transversely under the adjacent cradle member 30 to the opposite side where there is a similar gear mechanism connecting the shaft 38 with the rack bar 33; and by this arrangement the vehicle wheel frame is always held against lateral tilting movement even though the weight applied thereto be much greater at one side of the vehicle than the other.

In driving the front wheels of the vehicle upon the vehicle wheel cradle there is a tendency for the vehicle wheels to move the cradle longitudinally upon the rails 10. For the purpose of automatically gripping the vehicle dumping device to the rails for preventing such undesirable movement thereof, I have provided in the cradle frame, at each side, two spring gripping jaws 39, carried by the cradle frame and shaped to yieldingly and grippingly engage the head of the rail when the vehicle wheel cradle is at its lower limit of movement, as shown in Figure 2. With this device the vehicle driver may freely drive upon the vehicle wheel cradle without moving the cradle, and then as soon as the cradle moves upwardly a slight distance, the gripping jaws are released from the rail and the cradle is free to move longitudinally of the rails, and this action is entirely automatic.

For the purpose of preventing longitudinal tilting movements of the upright frames I have applied to each of the upright frames a pair of fingers 40, shown in Figure 4, and which extends downwardly and under the head of the rail 10, but normally out of frictional contact with the rail. These fingers do not in any way interfere with the longitudinal movements of the dump upon the rails, but if the upright frames should tilt longitudinally a slight distance, these fingers would, by engaging the rail head, prevent further objectionable tilting movements in that direction.

In practical use I have demonstrated that with my improvement the entire vehicle dumping device may be installed quickly and easily by unskilled workmen, and may be removed or replaced in various positions, and this may be done without any alteration of the structure, or shed in which the dump is installed, and no part of the dump extends below the floor line. When the vehicle wheel cradle is in its lowered position the front wheels of the vehicle may be driven upon it, so that the front wheels rest somewhere between the cradle members 30. During this movement of the vehicle the cradle cannot slide longitudinally of the rails because of the spring gripping jaws 39. The operator then admits fluid pressure to the cylinders and the vehicle wheel cradle moves upwardly and engages the vehicle wheels and holds the vehicle wheels against movement relative to the cradle. Before this upward movement is commenced, the vehicle is placed with its discharge end directly over the particular opening through which the grain is to be dumped, and the brakes are applied to the wheels. As soon as the cradle has moved upwardly a short distance the gripping jaws 39 are released automatically, and then the front of the vehicle will move in the arc of a circle, centered upon the axes of the rear wheels, and this means that the entire vehicle dump moves longitudinally upon the rails 10, and this movement is continued until the vehicle reaches such degree of inclination as will permit the discharge, by gravity, of its load. If the weight of the vehicle at one side is greater than that of the other side, there will be no lateral tilting of the cradle because of the rack and pinion construction for preventing such lateral tilting movement. The upright frames are always held in upright positions to prevent lateral tilting, because of the sheaves or grooved pulleys 26 being in engagement with the tubular upright members 12 on the main frames.

With my improvement a large number of vehicles to be dumped may be serviced in a minimum time because all that the vehicle operator need do is to drive his vehicle to position properly centered over the dumping opening and with the front wheels of the vehicle somewhere upon the vehicle wheel cradle, then the operator of the vehicle dump need only open the valve to admit fluid pressure to the cylinders, and close it when the vehicle has been elevated to such position as to dump the vehicle contents by gravity, and immediately the vehicle cradle may be lowered and driven off without any further attention on the part of the vehicle dump operator.

I claim as my invention:

1. In a vehicle dump, the combination of rails, two upright frame members, flanged supporting wheels for each frame member, mounted on said rails, a vehicle wheel cradle between said frame members, means for raising and lowering it, and means for automatically securing the frames to the rails against longitudinal movement when the vehicle wheel cradle is at its downward limit of movement, said means comprising gripping fingers carried by the vehicle wheel cradle to engage the rails when the cradle is lowered, and to release the rails when the cradle is elevated.

2. In a vehicle dump, the combination of rails, two upright frame members, flanged supporting wheels for each frame member, mounted on said rails, a vehicle wheel cradle between said frame members, means for raising and lowering it, and means for automatically securing the frames to the rails against longitudinal movement when the vehicle wheel cradle is at its downward limit of movement, said means comprising two spring gripping fingers to yieldingly engage opposite sides of a rail when the cradle is lowered, and to release the rail when the fingers are elevated above the rail.

3. In a vehicle dump, the combination of rails, two upright frame members, flanged supporting wheels for each frame member, mounted on said rails, a vehicle wheel cradle between said frame members, means for raising and lowering it, and means for automatically securing the frames against longitudinal movement when the vehicle wheel cradle is at its downward limit of movement, said means comprising fingers carried by the vehicle wheel cradle to engage a stationary member when the cradle is in its lowered position, and to release from same when the cradle is moved upwardly from same.

4. In a vehicle dump, the combination of two upright cylinders on opposite sides of the vehicle dump, a piston in each cylinder, a cradle to receive vehicle wheels, means for elevating and lowering said cradle from said piston, two cylindrical upright posts at each side of the vehicle dump, arranged on opposite sides of the cylinder, a frame for each of said posts connected to said cradle and comprising an upright frame, two grooved rollers at the top and two grooved rollers at the bottom of each of said frames, engaging opposite sides of the post for preventing tilting movements of the cradle.

5. In a portable vehicle dump, the combination of a frame, supporting wheels therefor, two upright frame members supported on the frame, a vehicle wheel cradle movable vertically between said frame members and guided thereby, means for raising and lowering the cradle and means for maintaining the cradle in level position during such movement, comprising a transverse shaft mounted on the under surface of the cradle, a small pinion fixed to each end of said shaft, upright racks fixed at their upper ends to said frame members, a large pinion in mesh with each of said small pinions, a small pinion fixed to each of said large pinions and in mesh with the adjacent rack, all of said pinions and racks being above said supporting wheels.

ELMER B. THOMPSON.